(12) United States Patent  (10) Patent No.: US 7,717,794 B2
Berger et al.  (45) Date of Patent: May 18, 2010

(54) LONGITUDINAL PLUNGING UNIT WITH CAGE SECURING MEANS

(75) Inventors: Arne Berger, Much (DE); Olf Wolf, Siegburg (DE); Stephan Maucher, Siegburg (DE); Heiko Kossack, Köln (DE); Robert Sandig, Sonthofen (DE)

(73) Assignee: GKN Driveline International GmbH, Lohmar (DE)

( * ) Notice: Subject to any disclaimer, the term of this patent is extended or adjusted under 35 U.S.C. 154(b) by 512 days.

(21) Appl. No.: 10/562,662

(22) PCT Filed: Jul. 22, 2005

(86) PCT No.: PCT/EP2005/008000

§ 371 (c)(1),
(2), (4) Date: Dec. 19, 2006

(87) PCT Pub. No.: WO2006/018096

PCT Pub. Date: Feb. 23, 2006

(65) Prior Publication Data

US 2007/0287545 A1  Dec. 13, 2007

(30) Foreign Application Priority Data

Aug. 16, 2004  (DE) .................... 10 2004 039 641

(51) Int. Cl.
  *F16D 3/06* (2006.01)
(52) U.S. Cl. .......................... 464/167; 384/49
(58) Field of Classification Search .......... 464/167, 464/146; 384/49, 51, 52
  See application file for complete search history.

(56) References Cited

U.S. PATENT DOCUMENTS

| 3,365,914 | A | 1/1968 | Asher |
| 4,257,244 | A * | 3/1981 | Welschof ............ 464/167 |
| 6,306,045 | B1 | 10/2001 | Jacob |
| 6,616,538 | B2 * | 9/2003 | Perrow ............ 464/146 |
| 6,705,948 | B2 | 3/2004 | Cermak et al. |
| 6,802,781 | B2 | 10/2004 | Schwarzler et al. |
| 6,902,487 | B2 | 6/2005 | Welschof |
| 2001/0018369 | A1 | 8/2001 | Cermak et al. |
| 2004/0137992 | A1 * | 7/2004 | Hildebrandt et al. |

FOREIGN PATENT DOCUMENTS

| DE | 296 11 785 U1 | 9/1996 | |
| DE | 198 24 477 A1 | 12/1999 | |
| FR | 1.373.752 | * 8/1964 | ............ 464/167 |

* cited by examiner

*Primary Examiner*—Greg Binda
(74) *Attorney, Agent, or Firm*—Rader, Fishman & Grauer PLLC

(57) ABSTRACT

A longitudinal plunging unit comprises a profiled sleeve with longitudinally extending first ball grooves, and a profiled journal with longitudinally extending second ball grooves. The profiled journal engages said profiled sleeve with balls arranged in groups in pairs of first ball groove and second ball grooves. A ball cage positioned between the profiled sleeve and the profiled journal fixes the balls in their axial position relative to one another. The ball cage is displaceable relative to the profiled journal between spaced axial stops. On the profiled journal, there is arranged a stop sleeve, which can abut the profiled journal or a component connected thereto. The stop sleeve delimits the displacement path of the ball cage towards the second portion.

12 Claims, 4 Drawing Sheets

US 7,717,794 B2

LONGITUDINAL PLUNGING UNIT WITH CAGE SECURING MEANS

TECHNICAL FIELD

The invention relates to a longitudinal plunging unit for transmitting torque in a shaft assembly, which longitudinal plunging unit comprises a profiled sleeve with circumferentially distributed, longitudinally extending first ball grooves and a profiled journal with circumferentially distributed, longitudinally extending second ball grooves. The profiled journal engages said profiled sleeve by means of an end facing the profiled sleeve. Pairs of first and second ball grooves contain balls which are arranged in groups and whose axial position relative to one another is fixed by a ball cage which is arranged radially between the profiled sleeve and the profiled journal. The ball cage is displaceable relative to the profiled journal or to the profiled sleeve between spaced axial stops.

BACKGROUND

During the relative longitudinal displacement between the profiled sleeve and the profiled journal, the balls roll in the first or outer and the second or inner ball grooves in a substantially friction-free way, so that the balls and thus the ball cage cover a total of half the displacement path between the profiled sleeve and the profiled journal. The longitudinal plunging unit thus permits a low-friction change in length of the shaft assembly.

It is necessary to delimit the displacement path of the ball cage by the spaced axial stops in order to avoid the ball cage from leaving the ball grooves. Even if, as a result of a ball groove run-out delimiting the ball grooves, the ball cage cannot run out as mentioned, it is essential to provide an axial stop so that the balls of the ball cage do not abut the ball groove run-out, which would result in a self-inhibiting effect.

From U.S. Pat. No. 6,306,045, it is known to work a first annular groove into the profiled sleeve at its end facing the profiled journal and, with axial distance therefrom, to work a second annular groove into the profiled sleeve, wherein in each first and second annular groove a securing ring is inserted, which securing rings form axial stops for the ball cage which is axially displaceable between said stops.

From U.S. Pat. No. 6,902,487, it is known to provide an annular stop member at the end of the profiled sleeve facing the profiled journal next to the securing ring, wherein the stop member is arranged radially between the profiled sleeve and the profiled journal. For assembly purposes, the stop member is inserted into the profiled sleeve. It form-fittingly engages the ball grooves and, by means of one end, is supported on a conical portion of the profiled sleeve, whereas the other end serves as a stop face for the ball cage. Producing such a stop member is complicated and expensive because its cross-sectional profile corresponds to the ball grooves. Furthermore, the stop member can be introduced into the sleeve in certain rotational angular positions only as otherwise it would not be able to engage the longitudinally extending ball grooves.

DE 296 11 785 U1 shows a longitudinal plunging unit with a profiled journal, a profiled sleeve and balls which are held therebetween in ball grooves and which are accommodated in a ball cage. At its free end which enters the profiled sleeve, the profiled journal comprises a stop plate against which the ball cage is able to abut. At the attaching end, the displacement path of the balls is delimited by the ball groove run-out.

U.S. Pat. No. 3,365,914 proposes a rotational coupling having an outer part and an inner part between which, in tracks, rollers are held in a ball cage for torque transmitting purposes. The displacement path of the ball cage is delimited by a shoulder in the outer part on the one hand and by a cover connected to the outer part on the other hand.

U.S. Pat. No. 6,802,781 shows a longitudinal plunging unit wherein the ball cage is able to abut the ball groove run-outs in order to delimit the displacement path.

U.S. Pat. No. 6,705,948 proposes a longitudinal plunging unit wherein the ball cage is able, in both directions, to abut securing rings positioned in annular grooves in the profiled journal. As already mentioned in connection with the profiled sleeve referred to above, the annular grooves are arranged in the region of the ball grooves and, respectively, in the region of the ball groove run-outs. When producing the annular grooves in a turning operation, this leads to an interrupted cut as a result of which the tools are subjected to an increase in wear. Furthermore, prior to producing the annular grooves, the components are usually hardened to prevent the formation of burr in the region of the ball grooves, which, in turn, leads to a further increase in tool wear, with the tool service life being reduced further and with the production costs being increased.

SUMMARY OF THE INVENTION

It is therefore an object of the invention to provide a longitudinal plunging unit which delimits the displacement path of the ball cage and which can be produced in any easy and costsaving way.

A longitudinal plunging unit for transmitting torque in a shaft assembly comprises, a profiled sleeve with circumferentially distributed, longitudinally extending first ball grooves; a profiled journal which comprises a first portion with circumferentially distributed, longitudinally extending second ball grooves with ball groove run-outs, as well as an axially adjoining second portion; balls which are arranged in groups in pairs of first ball grooves and second ball grooves, each time in groups, and a ball cage which is arranged radially between the profiled sleeve and the profiled journal and fixes the balls in their axial position relative to one another, wherein the ball cage is displaceable, relative to the profiled hub, between axial stops arranged at a distance from one another and wherein there is arranged an abutment sleeve on the profiled journal, which abutment sleeve is able to abut the profiled journal or a component connected thereto and delimits the displacement path of the ball cage towards the second portion.

By arranging the stop sleeve on the profiled journal, it is possible to produce an annular groove axially adjoining the ball groove run-outs in the second portion of the profiled journal in a continuous cut, thus reducing tool wear. "On the profiled journal" in this context means that the stop sleeve is arranged so as to extend coaxially relative to the profiled journal. Preferably, there is provided a radial gap between the stop sleeve and the profiled journal. However, the stop sleeve can also be slid on to the profiled journal with a press fit, with this solution being preferred if the stop sleeve is produced as a separate component. The inventive solution makes it possible for the stop sleeve to accommodate the axial forces acting on the ball cage and to conduct said axial forces by a suitable axial support for the stop sleeve into a region of the profiled journal arranged at a distance from the ball cage. Said axial support axially adjoins the ball groove run-outs in the second portion of the profiled journal which can be cylindrical in shape. It is thus possible to produce grooves in a continuous cut, which has an advantageous effect on tool wear.

In one embodiment, the stop sleeve comprises an inner diameter which is greater than a greatest outer diameter of the first portion of the profiled journal. The diameter of the inner bore is thus greater than an outer diameter in the region of the ball grooves of the profiled journal, as a result of which the stop sleeve can easily be slid over the first portion of the profiled journal without there being any need to observe an accurate position of the angle of rotation between the stop sleeve and the profiled journal.

According to another embodiment, the stop sleeve comprises an outer diameter which is smaller than the smallest inner diameter of the profiled sleeve in the region of the ball grooves. This means that, when the stop sleeve is in a centered position, it is not possible for the profiled journal to abut the stop sleeve in the axial direction during assembly or when the longitudinal plunging unit is inserted.

The component connected to the profiled journal can be a ball hub of a fixed joint which is fixed at the end of the profiled journal which faces away from the profiled sleeve. This reduces production costs because there is no need for any special measures for providing an axial support for the stop sleeve at the profiled journal.

According to a further embodiment, the length of the stop sleeve is designed such that the balls facing the second end, in the end position of the ball cage, are arranged at an axial distance from the ball groove run-out. In this way, the balls are prevented from abutting the ball groove run-outs, which could result in self-inhibition. The ball grooves extend over only part of the profiled journal, as a result of which, as compared to a profiled journal whose ball grooves extend over the entire length of same, the production of the ball grooves is more cost-effective because the length to be machined in a chip-forming way is shorter.

The stop sleeve can abut a securing ring positioned in an annular groove of the profiled journal, with the annular groove being arranged so as to axially adjoin the ball groove run-out of the profiled journal. The advantage of an annular groove produced in this way is that the cut during production is not interrupted, so that, as compared to producing the annular groove in the ball groove region, the service life of the tool is increased. In addition, the length of the stop sleeve is independent of the distance between the ball groove run-out and the part to be attached. It is thus possible to use an identical stop sleeve for longitudinal plunging units with different fixed joints. On the other hand, the embodiment wherein the stop sleeve is supported directly on the ball hub is advantageous in that there is no need for a securing ring.

In a further embodiment, the stop sleeve can abut an annular collar of the profiled journal which is arranged so as to axially adjoin the ball groove run-out of the profiled journal. A stop can be produced by carrying out a turning operation on the annular collar, as a result of which—in comparison with the embodiment comprising the securing ring—there is no need to produce the annular groove. In addition, it is possible to do without a securing ring. Furthermore, the length of the stop sleeve is independent of the distance between the ball groove run-out and the component to be attached, for example the ball hub of a constant velocity joint.

In another embodiment, the stop sleeve is produced so as to be integral with the ball cage, which reduces the number of individual components and eliminates the risk of the operatives forgetting to mount the stop sleeve on the profiled journal during the assembly of the longitudinal plunging unit. According to an alternative embodiment, the stop sleeve can also be produced separately. This is advantageous in that it is easy to adjust to different installation conditions without having to change the shape of the ball cage.

The stop sleeve is preferably made of plastics or metal. When selecting the material and when dimensioning the stop sleeve care has to be taken to ensure that the stop sleeve can safely accommodate the assembly forces and sliding assembly forces.

BRIEF DESCRIPTION OF THE DRAWINGS

The invention will be explained in greater detail with reference to the embodiments illustrated in the drawings wherein.

DETAILED DESCRIPTION

Figure 1:
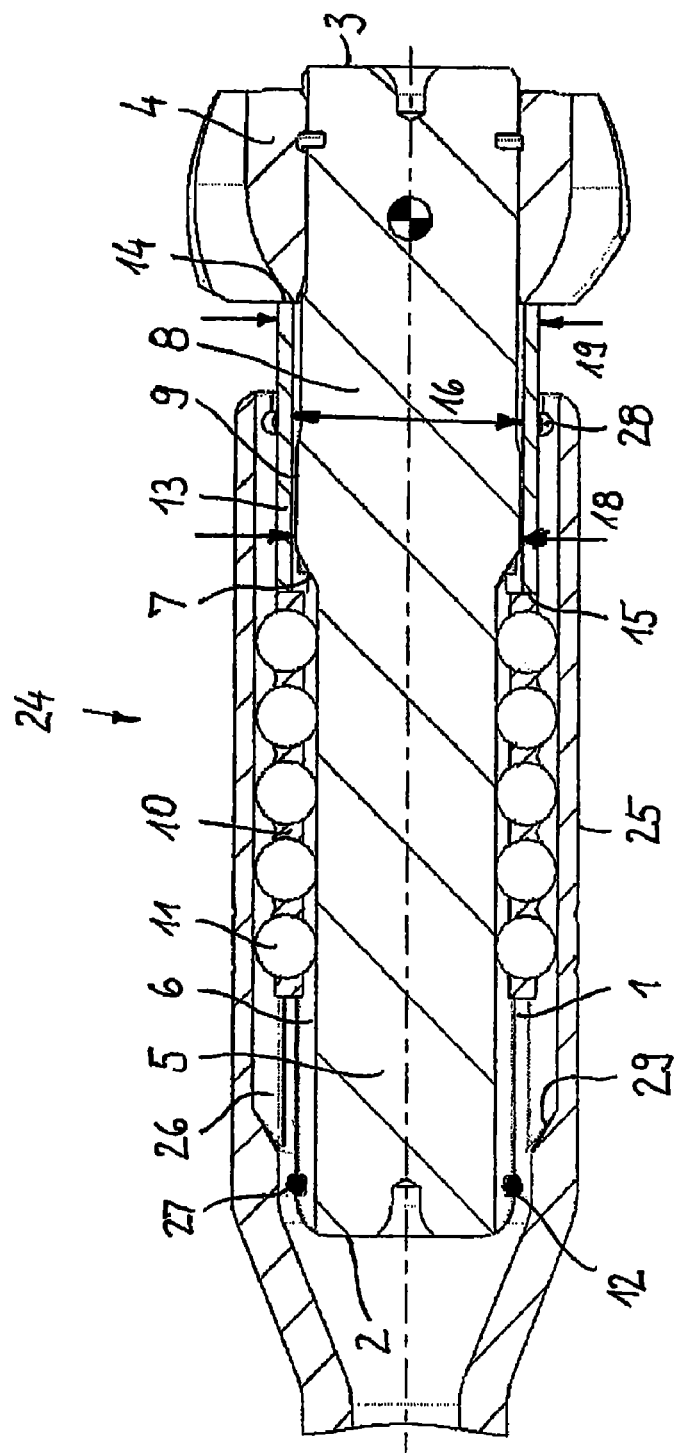
FIG. 1 shows a longitudinal plunging unit in a first embodiment.

FIGS. 1 to 4 each show a longitudinal plunging unit 24 in a longitudinal section with a profiled sleeve 25 into which there has been inserted a profiled journal 1 by an end 2 facing the profiled sleeve 25. The profiled journal 1 comprises an end 3 which faces away from the profiled sleeve 25 and to which there has been fixed a ball hub 4 of a constant velocity universal joint (not further illustrated here). The profiled sleeve 25 comprises longitudinally extending parallel first ball grooves 26 on its inside. The profiled journal 1, in a first portion 5, comprises longitudinally extending second ball grooves 6 whose circumferential position corresponds to that of the first longitudinal grooves 26. Each ball groove 6 extends from the end 2 of the profiled journal 1, which end 2 faces the profiled sleeve 25, to a ball groove run-out 7. The first portion 5 is followed by a second portion 8 of the profiled journal 1 which does not comprise any ball grooves and which has been provided with an annular collar 9.

A ball cage 10 with balls 11 is positioned on the profiled journal 1. The ball cage 10 fixes the balls 11 in their relative position to one another. The balls 11, in this case five balls, run in groups in the respective ball grooves 6 when the ball cage 10 is displaced in the longitudinal direction of the profiled journal 1. The ball cage 10 is displaced relative to the profiled journal 1 if, in a finish-assembled longitudinal plunging unit 24, the profiled journal 1 and the profiled sleeve 25 are axially displaced relative to one another and if, in the process, the balls 11 roll in the ball grooves 5 of the profiled journal 1 and in the opposed ball grooves 26 of the profiled sleeve 25.

The possible displacement path of the ball cage 10 relative to the profiled journal 1 id delimited, on the one hand, by a securing ring 27 inserted into an annular groove 12 at the end 2 of the profiled journal 1 and against which the ball cage 10 is able to abut. On the other hand, in FIG. 1, the displacement path of the ball cage 10 is delimited by a stop sleeve 13 arranged between the ball cage 10 and the ball hub 4. The stop sleeve 13, by a first end 14, is supported on the ball hub 4, the ball cage 10 rests in a planar way against the second end 15 of the stop sleeve 13. The length of the stop sleeve 13 is such that the balls 11 facing the stop sleeve 13, in the end position of the ball cage 10, are each arranged with an axial distance from the ball groove run-out 7. The stop sleeve 13 thus prevents the ball cage 10 from moving out of its position shown in FIG. 1 towards the end 3 of the profiled journal 1, as a result of which the balls 11 at the joint end of the ball cage are prevented from running into the ball groove run-out. The displacement path of the ball cage 10 relative to the profiled sleeve 25, at the joint end, is delimited by a securing ring (not illustrated) which is inserted into an annular groove 28 at the end of the profiled sleeve 25 and acts as an anti-extraction aid during transport. The securing ring can be abutted by the balls 11 at the joint end, so that the profiled journal 1 is prevented from sliding out of the profiled sleeve 25. At the shaft end, the displacement path of the ball cage 10 is delimited in that it abuts the ball groove run-out 29. The balls 11 are thus prevented from jamming at the ball groove run-out 29 during transport.

The inner diameter 16 of the stop sleeve 13 is dimensioned in such a way that the stop sleeve 13 can be slid over the first portion 5 onto the profiled sleeve 25. The inner diameter 16 is greater than the diameter of a circle on which there are positioned outer edges 17 of the ball grooves 6. Furthermore, the inner diameter 16 is greater than an outer diameter 18 of the annular collar 9 so that the stop sleeve 13 can also be slid over the second portion 8 of the profiled journal 1.

The outer diameter 19 of the stop sleeve 13 is smaller than a smallest inner diameter of the profiled sleeve 25 in the region of the ball grooves 26.

The stop sleeve 13 may be constructed of plastic or metal.

Figure 2:
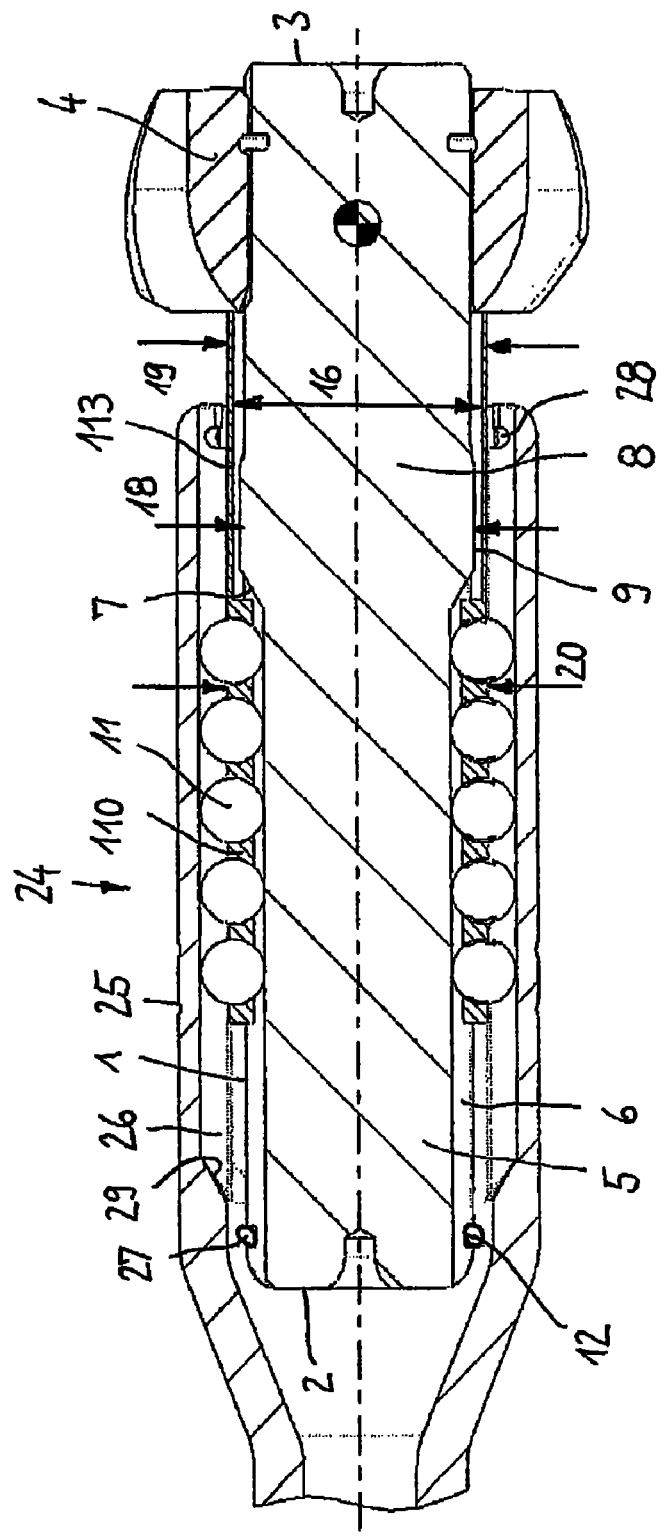
FIG. 2 shows a longitudinal plunging unit in a second embodiment.

FIG. 2 shows a further embodiment of the invention. The difference relative to the embodiment according to FIG. 1 is that a stop sleeve 113 is formed on to the ball cage 110 so as to be integral therewith. An outer diameter 19 of the stop sleeve 113 corresponds an outer diameter 20 of the ball cage 110 fixing the balls 11. The stop sleeve 113 is directly supported on the ball hub 4 of the constant velocity joint.

Figure 3:
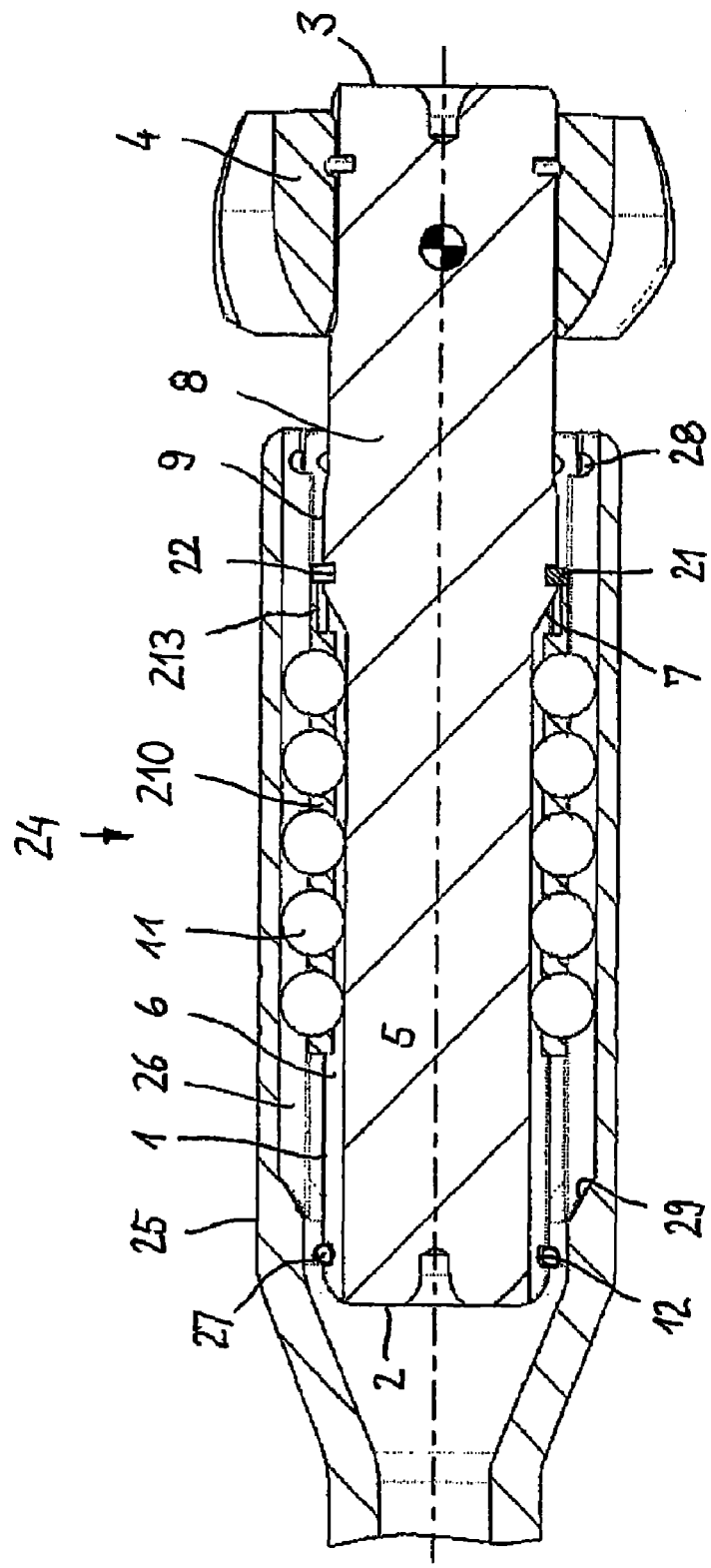
FIG. 3 shows a longitudinal plunging unit in a third embodiment.

FIG. 3 shows an embodiment wherein, as in FIG. 2, a stop sleeve 213 has been integrally formed on to the ball cage 210. The stop sleeve 213, by its first end 14, is supported on a securing ring 21 positioned in an annular groove 22 machined into the annular collar 9. The annular groove 22 can be produced by a continuous cut in the annular collar 9.

Figure 4:
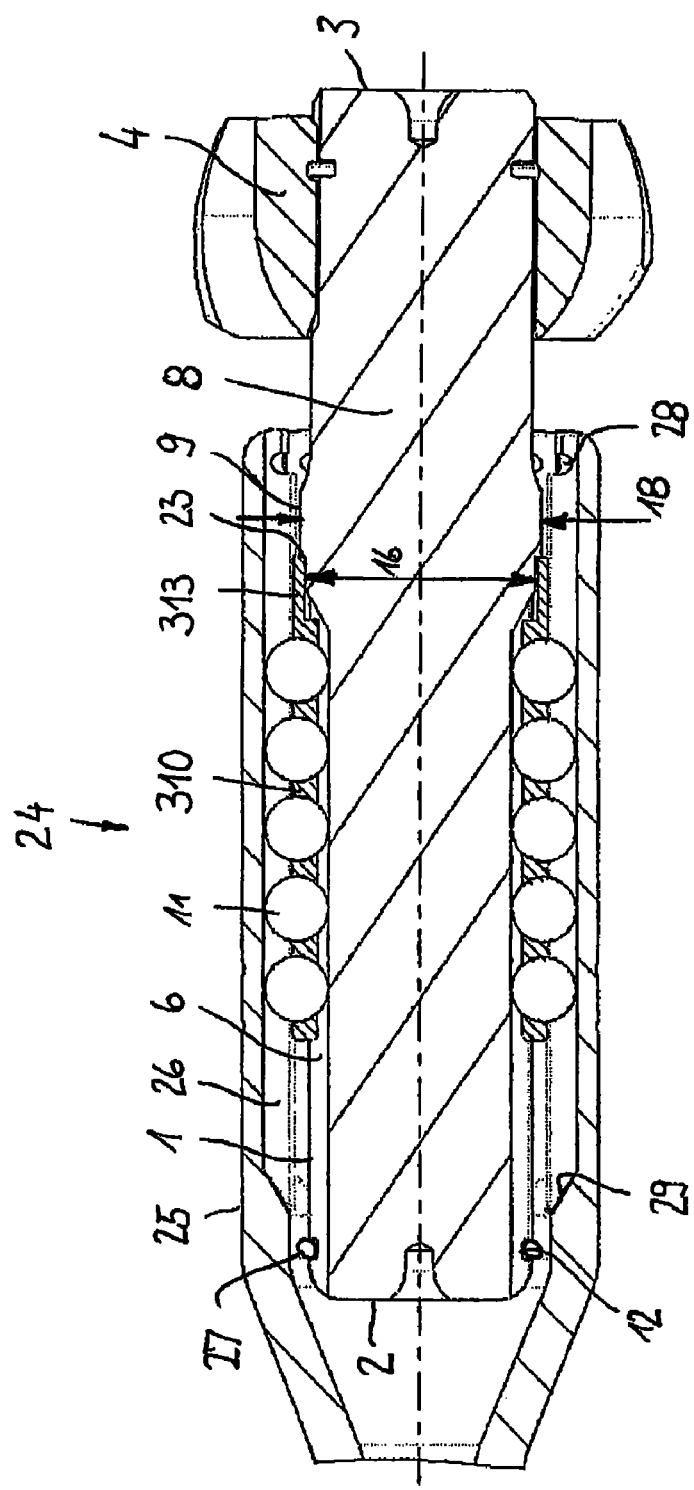
FIG. 4 shows a longitudinal plunging unit in a fourth embodiment.

In the embodiment according to FIG. 4, a stop sleeve 313 integrally produced at the ball cage 310 is supported on a stop 23 of the profiled journal 1 which is formed by a step in the annular collar 9. The outer diameter 18 of the annular collar 9 is greater than the inner diameter 16 of the stop sleeve 313.

The invention claimed is:

1. A longitudinal plunging unit for transmitting torque in a shaft assembly, comprising:
   a profiled sleeve with circumferentially distributed, longitudinally extending first ball grooves;
   a profiled journal which comprises a first portion with circumferentially distributed, longitudinally extending second ball grooves with ball groove run-outs, and an axially adjoining second portion;
   balls which are arranged in groups in pairs of first ball grooves and second ball grooves;
   a ball cage arranged radially between the profiled sleeve and the profiled journal and fixing the balls in their axial position relative to one another, wherein the ball cage is displaceable, relative to the profiled journal, between axial stops arranged at a distance from one another; and
   an abutment sleeve on the profiled journal and abutting the profiled journal or a component connected thereto to delimit the displacement path of the ball cage towards the second portion, wherein the abutment sleeve abuts the profiled journal or the component connected thereto with an axial distance from the ball groove run-outs in a region of the second portion of the profiled journal, wherein the abutment sleeve abuts the profiled journal or the component connected thereto with an axial distance from the ball groove run-outs in a region of the second portion of the profiled journal, wherein the abutment sleeve comprises an inner diameter which is greater than a greatest outer diameter of the first portion of the profiled journal.

2. A longitudinal plunging unit according to claim 1, wherein the abutment sleeve comprises an outer diameter which is smaller than a smallest inner diameter of the profiled sleeve in a region of the ball grooves.

3. A longitudinal plunging unit according to claim 2, wherein a length of the abutment sleeve is such that the balls facing the abutment sleeve, in an end position of the ball cage, are each arranged with an axial distance from the ball groove run-out.

4. A longitudinal plunging unit according to claim 2, wherein the abutment sleeve is integral with the ball cage.

5. A longitudinal plunging unit according to claim 1, wherein the abutment sleeve comprises an outer diameter which is smaller than a smallest inner diameter of the profiled sleeve in a region of the ball grooves.

6. A longitudinal plunging unit according to claim 1, wherein the abutment sleeve abuts a ball hub of a constant velocity universal joint secured to an end of the profiled journal, which end faces away from the profiled sleeve.

7. A longitudinal plunging unit according to claim 1, wherein a length of the abutment sleeve is such that the balls facing the abutment sleeve, in an end position of the ball cage, are each arranged with an axial distance from the ball groove run-out.

8. A longitudinal plunging unit according to claim 7, wherein the abutment sleeve is integral with the ball cage.

9. A longitudinal plunging unit according to claim 1, wherein a length of the abutment sleeve is such that the balls facing the abutment sleeve, in an end position of the ball cage, are each arranged with an axial distance from the ball groove run-out.

10. A longitudinal plunging unit according to claim 1, wherein the abutment sleeve is integral with the ball cage.

11. A longitudinal plunging unit according to claim 1, wherein the abutment sleeve is plastic or metal.

12. A longitudinal plunging unit for transmitting torque in a shaft assembly, comprising:
    a profiled sleeve with circumferentially distributed, longitudinally extending first ball grooves;
    a profiled journal which comprises a first portion with circumferentially distributed, longitudinally extending second ball grooves with ball groove run-outs, and an axially adjoining second portion;
    balls which are arranged in groups in pairs of first ball grooves and second ball grooves;
    a ball cage arranged radially between the profiled sleeve and the profiled journal and fixing the balls in their axial position relative to one another, wherein the ball cage is displaceable, relative to the profiled journal, between axial stops arranged at a distance from one another; and
    an abutment sleeve on the profiled journal and abutting the profiled journal or a component connected thereto to delimit the displacement path of the ball cage towards the second portion, wherein the abutment sleeve abuts the profiled journal or the component connected thereto with an axial distance from the ball groove run-outs in a region of the second portion of the profiled journal, and wherein the abutment sleeve is integral with the ball cage.

\* \* \* \* \*

UNITED STATES PATENT AND TRADEMARK OFFICE
CERTIFICATE OF CORRECTION

PATENT NO. : 7,717,794 B2  Page 1 of 1
APPLICATION NO. : 10/562662
DATED : May 18, 2010
INVENTOR(S) : Arne Berger et al.

It is certified that error appears in the above-identified patent and that said Letters Patent is hereby corrected as shown below:

Title Page; item (75); In the section for Inventors:

Please correct the spelling of the second inventor ~~Olf Wolf~~ to Olaf Wolf.

Signed and Sealed this

Thirteenth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,717,794 B2 Page 1 of 1
APPLICATION NO. : 10/562662
DATED : May 18, 2010
INVENTOR(S) : Arne Berger et al.

It is certified that error appears in the above-identified patent and that said Letters Patent is hereby corrected as shown below:

Claim 1, column 5, lines 63-65 to column 5, midway through line 1, please delete the second entry of "~~wherein the abutment sleeve abuts the profiled journal or the component connected thereto with an axial distance from the ball groove run-outs in a region of the second portion of the profiled journal~~"

Signed and Sealed this

Twenty-fourth Day of August, 2010

David J. Kappos
*Director of the United States Patent and Trademark Office*